(12) United States Patent
Jakubzak et al.

(10) Patent No.: US 11,675,195 B2
(45) Date of Patent: Jun. 13, 2023

(54) ALIGNMENT OF 3D REPRESENTATIONS FOR HOLOGRAM/AVATAR CONTROL

(71) Applicant: Microsoft Technology Licensing, LLC, Redmond, WA (US)

(72) Inventors: Kenneth Mitchell Jakubzak, Lynnwood, WA (US); Matthew Julian Lamb, Seattle, WA (US); Brent Michael Wilson, Seattle, WA (US); Toby Leonard Sharp, Cambridge (GB); Thomas Joseph Cashman, Cambridge (GB); Jamie Shotton, Cambridge (GB); Erroll William Wood, Cambridge (GB); Jingjing Shen, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/327,520

(22) Filed: May 21, 2021

(65) Prior Publication Data

US 2022/0373800 A1 Nov. 24, 2022

(51) Int. Cl.
*G02B 27/01* (2006.01)
*G06F 3/01* (2006.01)
*G06T 13/40* (2011.01)

(52) U.S. Cl.
CPC ......... *G02B 27/0172* (2013.01); *G06F 3/011* (2013.01); *G06T 13/40* (2013.01);
(Continued)

(58) Field of Classification Search
CPC .......... G06F 3/011; G06F 3/012; G06F 3/013; G06F 3/017; G02B 27/01; G02B 27/017;
(Continued)

(56) References Cited

U.S. PATENT DOCUMENTS 9,191,620 B1 * 11/2015 Katzer ............... H04M 3/42042
11,113,859 B1 * 9/2021 Xiao ..................... G06T 15/005
(Continued)

OTHER PUBLICATIONS

Achenbach, et al., "Fast Generation of Realistic Virtual Humans", In Proceedings of the 23rd ACM Symposium on Virtual Reality Software and Technology, Nov. 8, 2017, 10 Pages.
(Continued)

*Primary Examiner* — Keith L Crawley
(74) *Attorney, Agent, or Firm* — Barta, Jones & Foley, PLLC

(57) ABSTRACT

In various examples there is an apparatus for aligning three-dimensional, 3D, representations of people. The apparatus comprises at least one processor and a memory storing instructions that, when executed by the at least one processor, perform a method comprising accessing a first 3D representation which is an instance of a parametric model of a person; accessing a second 3D representation which is a photoreal representation of the person; computing an alignment of the first and second 3D representations; and computing and storing a hologram from the aligned first and second 3D representations such that the hologram depicts parts of the person which are observed in only one of the first and second 3D representations; or controlling an avatar representing the person where the avatar depicts parts of the person which are observed in only one of the first and second 3D representations.

20 Claims, 7 Drawing Sheets

(52) U.S. Cl.
CPC ............... *G02B 2027/0174* (2013.01); *G02B 2027/0198* (2013.01)

(58) Field of Classification Search
CPC ........ G02B 27/0172; G02B 2027/0109; G02B 2027/0174; G02B 2027/0198; G06V 10/16; G06V 10/20–422; G06V 10/44–457; G06V 10/62; G06V 10/70; G06V 10/74–768; G06V 10/80–88; G06V 20/20; G06V 20/48; G06V 20/653; G06V 40/20–28; H04N 13/10–167; H04N 2013/0074–0096; G03H 2001/0088; G06T 7/0002; G06T 7/0012; G06T 7/0014; G06T 7/0016; G06T 7/20; G06T 7/215; G06T 7/246; G06T 7/248; G06T 7/251; G06T 7/277; G06T 7/285; G06T 7/292; G06T 7/30–38; G06T 7/70–77; G06T 7/97; G06T 13/20; G06T 13/40; G06T 15/08; G06T 15/10; G06T 15/20; G06T 15/205; G06T 19/003; G06T 19/006; G06T 19/20; G06T 2200/04; G06T 2200/08; G06T 2207/20212–20224; G06T 2207/30196

See application file for complete search history.

(56) References Cited

U.S. PATENT DOCUMENTS

| | | | |
|---|---|---|---|
| 11,127,223 B1* | 9/2021 | Bhushan | G06T 17/20 |
| 2013/0187919 A1 | 7/2013 | Medioni et al. | |
| 2015/0109411 A1* | 4/2015 | Lee | H04N 13/189 348/43 |
| 2015/0356767 A1 | 12/2015 | Suma et al. | |
| 2017/0103672 A1* | 4/2017 | Dey | G06V 40/23 |
| 2018/0158246 A1* | 6/2018 | Grau | G02B 27/0093 |
| 2019/0213773 A1* | 7/2019 | Lee | H04L 67/38 |
| 2019/0325633 A1* | 10/2019 | Miller, IV | G06V 40/172 |
| 2020/0099824 A1* | 3/2020 | Benemann | G01S 17/86 |
| 2020/0160613 A1* | 5/2020 | Han | G06V 40/103 |
| 2020/0160615 A1* | 5/2020 | Jang | G06T 19/20 |
| 2020/0402284 A1* | 12/2020 | Saragih | G06T 13/40 |
| 2021/0150792 A1* | 5/2021 | Ulyanov | A63F 13/537 |
| 2021/0209347 A1* | 7/2021 | Hu | G06V 40/176 |
| 2021/0375020 A1* | 12/2021 | Zhang | G06T 7/251 |

OTHER PUBLICATIONS

Feng, et al., "Avatar Reshaping and Automatic Rigging Using a Deformable Model", In Proceedings of the 8th ACM SIGGRAPH Conference on Motion in Games, Nov. 16, 2015, 8 Pages.

Orts-Escolano, et al., "Holoportation: Virtual 3D Teleportation in Real-time", In Proceedings of the 29th Annual Symposium on User Interface Software and Technology, Oct. 16, 2016, 14 Pages.

"International Search Report and Written Opinion Issued in PCT Application No. PCT/US22/026620", dated Aug. 23, 2022, 17 Pages.

Regateiro, et al., "Hybrid Skeleton Driven Surface Registration for Temporally Consistent Volumetric Video", In Proceedings of International Conference on 3D Vision (3DV), Sep. 5, 2018, 9 Pages.

Zhang, et al., "Quality Dynamic Human Body Modeling Using a Single Low-Cost Depth Camera", In Proceedings of Quality Dynamic Human Body Modeling Using a Single Low-Cost Depth Camera, Jun. 23, 2014, pp. 676-683.

* cited by examiner

ALIGNMENT OF 3D REPRESENTATIONS FOR HOLOGRAM/AVATAR CONTROL

BACKGROUND

Holograms are a very useful way to convey 3D information and facilitate collaboration between remote users. Holograms are also used as part of user interfaces to improve human-computer interaction. Holograms are three-dimensional (3D) virtual objects displayed to a viewer using a hologram projection apparatus such as a head-mounted display or other stereoscopic display apparatus for mixed-reality display, virtual reality display or other types of display. In particular applications, such as holoportation, there are at least two people participating in a video call. A hologram depicting one of the participants is computed from sensor data depicting that participant (such that the hologram resembles the physical appearance of the particular participant). The hologram is transmitted to the remote participant in the video call and projected using hologram projection apparatus to the remote participant. In this way many useful applications are enabled such as remote instruction of medical staff and others. Accurate and reliable computation of holograms is not straightforward however.

Avatars are virtual representations of people which schematically represent a person rather than being an actual depiction of a particular person. Avatars are useful for remote collaboration such as where realistic holograms depicting video call participants are unavailable due to resource constraints.

The embodiments described below are not limited to implementations which solve any or all of the disadvantages of known apparatus for controlling holograms and/or avatars.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is an apparatus for aligning three-dimensional, 3D, representations of people. The apparatus comprises at least one processor and a memory storing instructions that, when executed by the at least one processor, perform a method comprising accessing a first 3D representation which is an instance of a parametric model of a person; accessing a second 3D representation which is a photoreal representation of the person; computing an alignment of the first and second 3D representations; and computing and storing a hologram from the aligned first and second 3D representations such that the hologram depicts parts of the person which are observed in only one of the first and second 3D representations; or controlling an avatar representing the person where the avatar depicts parts of the person which are observed in only one of the first and second 3D representations.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Figure 1:
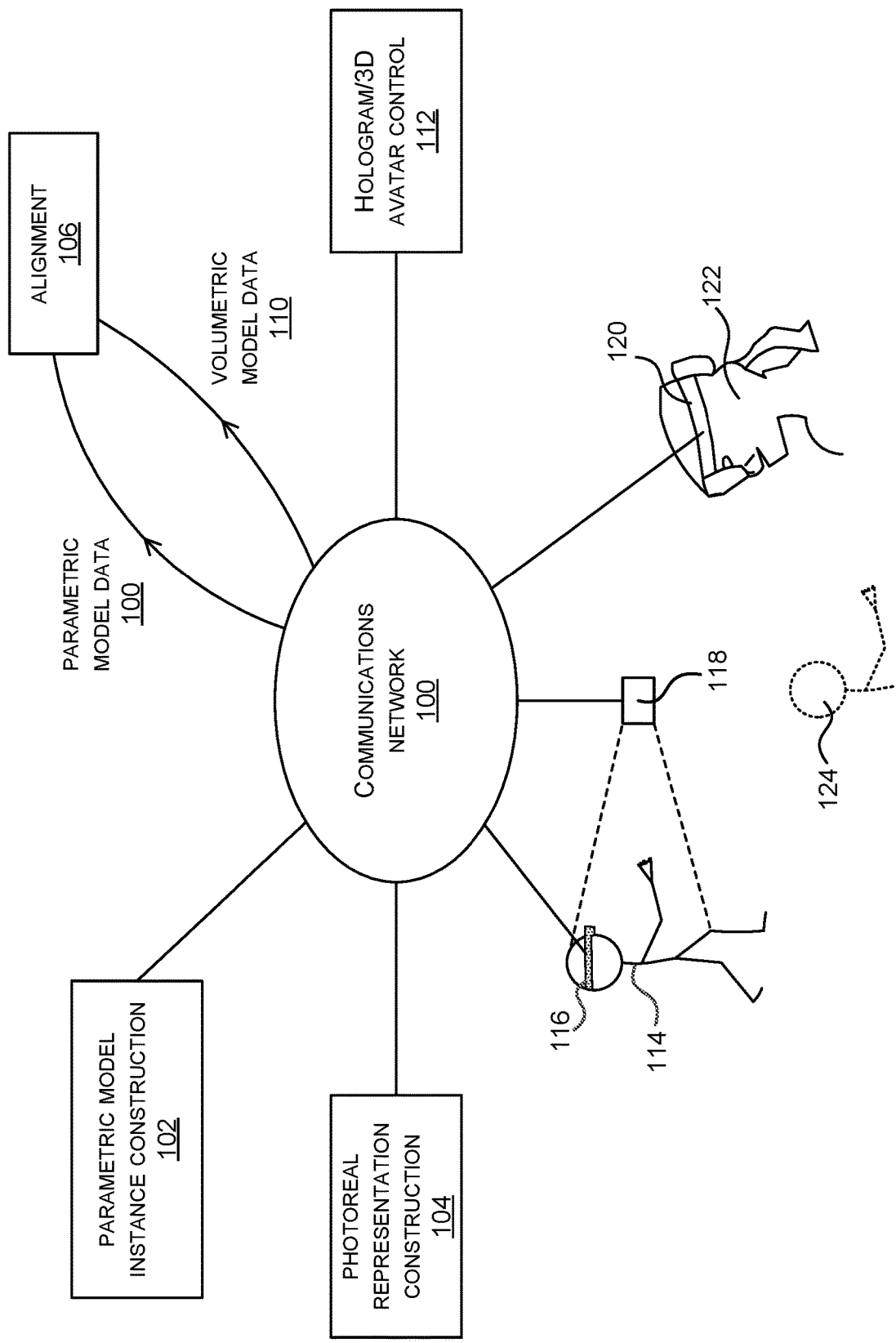
FIG. 1 is a schematic diagram of an alignment service deployed in the cloud and used as part of a communication system to enable a hologram or avatar depicting a person to be transmitted to a remote participant.

FIG. 1 shows an alignment service 106 connected to a communications network 100 such as the internet, an intranet or any other communications network. The alignment service is implemented using any of software, firmware, hardware and has functionality to align 3D representations of a person such as real person 114 in FIG. 1. The alignment service receives as input information from two different 3D representations of the person 114. A first one of the 3D representations is an instance of a parametric model and a second one of the 3D representations is a photoreal representation. The alignment service receives parametric model data 108 and photoreal representation data 110 and it computes an alignment for aligning the two 3D representations. The alignment is a mathematical transformation such as a mapping. The alignment service 106 makes the mathematical transformation available to other entities connected to the communications network 100 such as hologram/3D avatar control function 112. The hologram/3D avatar control function 112 uses the alignment information (e.g., the mathematical transformation or mapping) to facilitate generating a hologram from the two representations or to facilitate control of an avatar. The hologram depicts the person 114 in a realistic manner such that the hologram resembles the true likeness of the person 114. The avatar depicts the person 114 schematically by showing the position and movement of the person's head, hands and limbs but without being a true likeness of the person 114.

FIG. 1 shows a remote participant 122 of an ongoing communication session with the person 114. The remote participant is able to see a hologram 124 depicting the person 114. The hologram is displayed using a head mounted display 120 worn by the remote participant 122 or is displayed using any other type of stereoscopic display apparatus. The hologram 124 is computed using the two 3D representations of person 114 which have been aligned using alignment service 106. In this way the hologram is able to robustly depict the person even where parts of the person are only observed in one of the 3D representations. One of the 3D representations is able to "fill in the gaps" regarding parts of the person which are absent from the other 3D representation and vice versa. The two different 3D representations are formed from observed data captured by capture devices. The information available in the two different 3D representations differs so that by using both 3D representations to generate holograms or control an avatar, more accurate and complete holograms or avatar control is achieved (as compared with using only one of the 3D representations). In order to enable both 3D representations to be used these are aligned using the alignment service 106.

In the example shown in FIG. 1 there is a photoreal representation construction function 104 and a parametric model instance construction function 102. These functions are connected to communications network 100 and are deployed using any of: software, firmware, hardware. Data captured from two or more capture devices 116, 118 is made available to the photoreal representation construction function 104 and the parametric model instance construction function 102. The capture devices 116, 118 include a wearable capture device 116 such as a camera in a head mounted display, and an external capture device 118 which is independent of the person 114 and arranged to capture images depicting the person 114. Each capture device 116, 118 is any type of image capture device for capturing images of at least part of the person 114. A non-exhaustive list of example capture devices which are used is: red green blue video camera, depth camera, time of flight camera, infra-red camera, web camera, video camera. In some examples the external camera 118 is mounted on a wall of a room where the person is present. In some examples the external camera 118 is in a computing device on a desk, where the person 114 is using the computing device to carry out a communication session with the remote participant 122.

A photoreal representation of a person is a depiction of a person which resembles the actual person.

A volumetric model comprises a plurality of voxels, each voxel representing a region of real world space, and where information is stored in the voxels about whether a surface passes through the voxel. A volumetric model is constructed from depth data using an iterative closest point algorithm. The resulting volumetric model stores a 3D surface reconstruction which represents 3D surfaces in a scene depicted in captured depth data of the scene. A volumetric model is one example of a type of photoreal representation.

In the example of FIG. 1 the photoreal representation construction function 104 receives depth data depicting the person from one or both of the external capture device 118 and the wearable capture device 116. The depth data comprises a stream of frames of point clouds. Iterative closest point is used to compute a 3D surface reconstruction from the stream of point clouds. The point clouds are either obtained directly from the capture devices where these are depth cameras or is derived from color images where the capture devices are red, green, blue video cameras. Because a volumetric model, or other photoreal representation, is constructed from observed data it represents those observations and is unable to represent surfaces which are outside the field of view of capture devices used to obtain the observed data. In an example where the person is raising his or her hand within a field of view of the external capture device 118 as shown in FIG. 1 it is possible for a volumetric model, or other photoreal representation, to represent the raised hand by using data from the external capture device 118. When the person's hand is outside the field of view of the capture devices 116, 118 it is not possible for the volumetric model, or other photoreal representation, to represent the hand.

A parametric model is a generic 3D model of a class of object such as a person, where the generic model has parameters which can be set to particular values in order to make the generic model fit a particular instance of the object. Where the object is articulated as in the case of a person, the generic model is a skeletal model and the parameters are 3D positions and orientations of joints of the skeletal model. In some cases the generic 3D model is a rigged smooth-surface model which is a skeletal model that has an outer smooth-surface to represent a person, and in this case the parameters optionally include shape parameters. In the case of a parametric model, observed data about the person 114 is used to adjust values of the parameters of the model so that the model corresponds to the position and orientation of the person 114 and optionally to the shape of the person 114. Since the parametric model is formed from a generic 3D model it includes all parts of the person 114 even where parts of the person are occluded or not visible in the observed data. However, the values of the parameters for the parts of the model which are occluded or not visible in the observed data are less accurate than for visible parts. The process of determining the values of the parameters to use for particular observed data is referred to as model fitting. The parametric model is fitted to the observed data from one or both of the capture devices 116, 118 using any suitable model fitting technology. Examples of model fitting technology which are used include: machine learning model fitting, finding candidate correspondences between observed data and model and computing an optimization.

In the example of FIG. 1 the alignment service 106 is deployed in the cloud. The photoreal representation construction function 104 and the parametric model instance construction function 102 are also shown as deployed in the cloud. However, it is not essential to use cloud deployments. The functionality is implemented in a head worn computing device and/or external capture device in some examples. The functionality is sharable between the head worn computing device, external capture device 118 and zero or more computing resources in communications network 100.

The alignment functionality of the disclosure operates in an unconventional manner to enable two different 3D representations of a person to be used to generate holograms and/or drive avatars depicting the person. The resulting holograms and/or avatars are controlled in a more realistic and complete manner than is otherwise possible.

The alignment functionality improves the functioning of an underlying computing device by enabling two different 3D representations of a person to be used to generate holograms and/or drive avatars depicting the person.

Alternatively, or in addition, the alignment functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
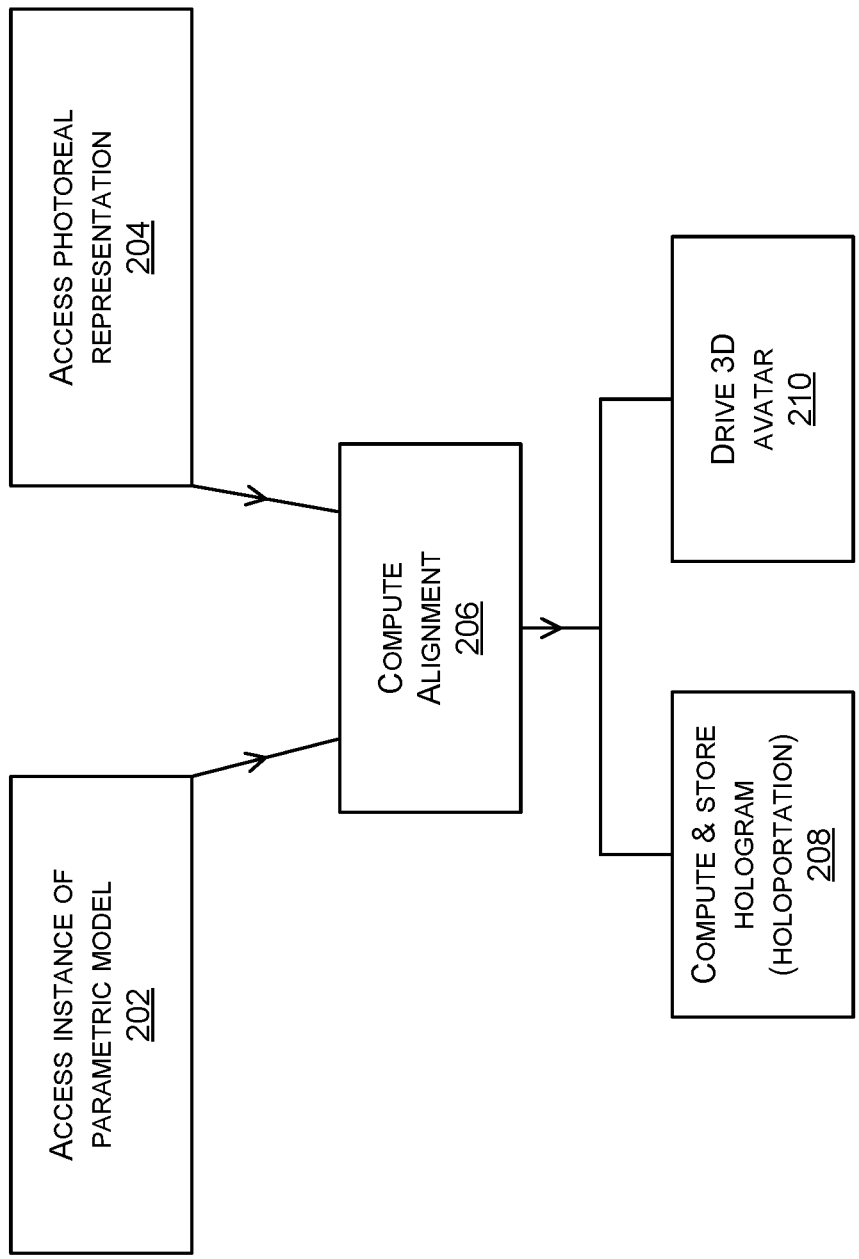
FIG. 2 is a flow diagram of a process carried out at the alignment service of FIG. 1.

With reference to FIG. 2 there is a process at the alignment service 106. The alignment service 106 accesses 202 at least one instance of a parametric model of the person 114 or data from the parametric model. The alignment service 106 also accesses 204 a photoreal representation of the person 114. In an example the alignment service is sent the information it accesses at operations 202 and 204 by the parametric model instance construction function 102 and the photoreal representation construction function 104. In another example the alignment service retrieves the information it accesses at operations 202 and 204 by sending requests to functions 102 and 104.

An alignment is computed 206 between two 3D representations of the person 114 by computing a mathematical transform or mapping as explained below. The aligned 3D representations are then usable to compute and store 208 a hologram, for holoportation or similar applications. The aligned 3D representations are also usable to drive 210 (e.g., control) a 3D avatar representing the person 114.

In the example of FIG. 2 the alignment operates for single instances of the data rather than a stream of instances. Where there are streams of instances latency between the streams is optionally taken into account.

Figure 3:
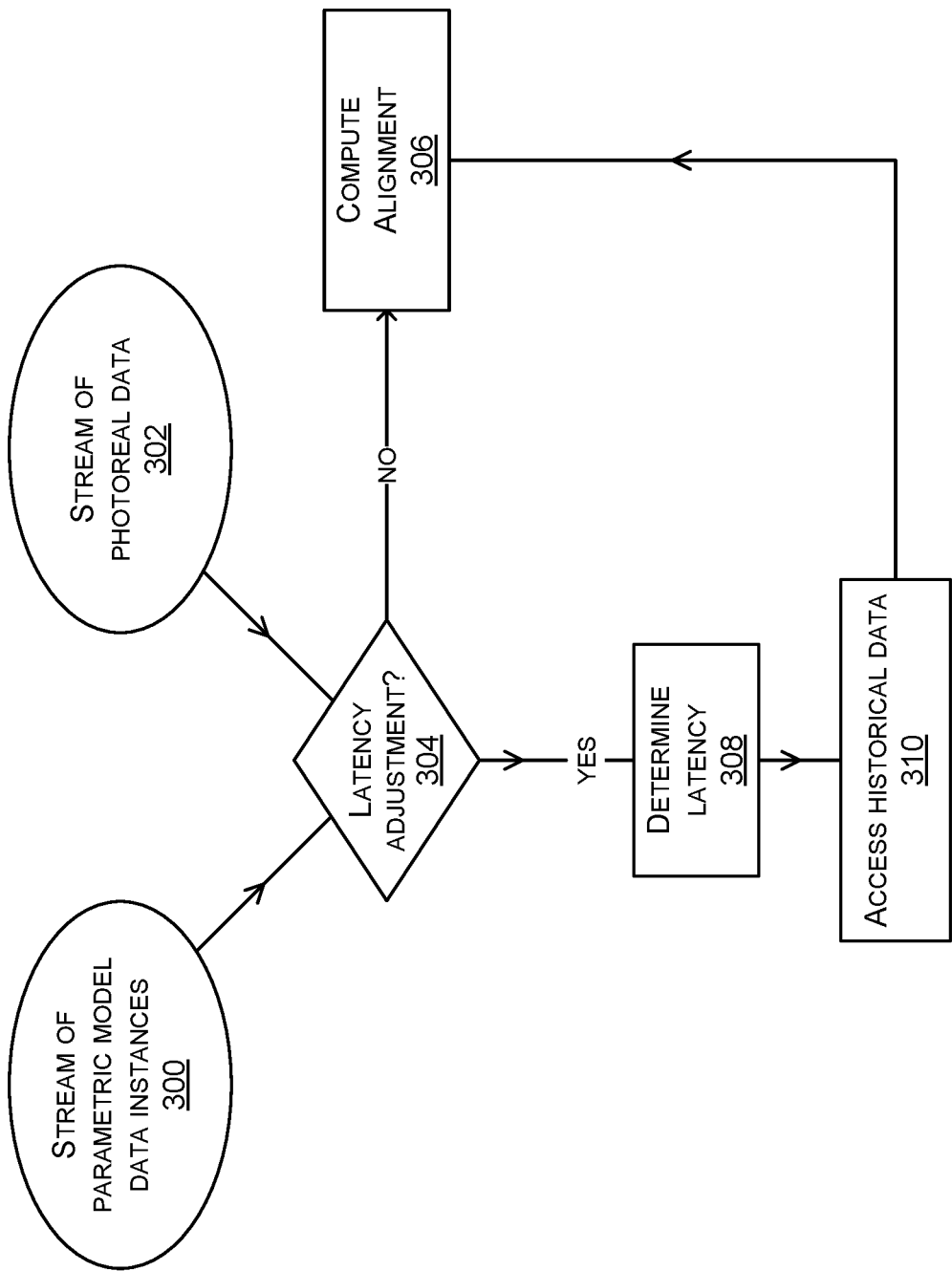
FIG. 3 is a flow diagram of another process carried out at the alignment service of FIG. 1.

With reference to FIG. 3 there is a stream of parametric model data 300 and a stream of photoreal representation data 302. Capture devices 116, 118 each capture one or more streams of frames of data and the streams are used by the functions 102, 104 to compute updates to the photoreal representation construction function 104 and parametric model instance construction function 102. The streams of captured data depict the person as the person animates such as by moving about, speaking, making hand movements. As a result the photoreal representation construction function 104 comprises different information at different times, since parts of the person move into and out of a field of view of one or both of the capture devices. The parameter values of the parametric model also change as the person animates.

The time taken to obtain the observed data and use it to compute the parameter values of the parametric model often differs from the time taken to do that for the photoreal representation. The time difference is referred to as a latency between the streams 300, 302.

In some embodiments latency between the streams 300, 302 is ignored and alignment of the 3D representations proceeds (operation 306) without any latency adjustment 304. Good working results are obtained without any latency adjustment 304 where there is little movement of the person 114 and/or where the amount of latency is not enough to cause problems. Thus FIG. 3 shows a check at operation 304 as to whether latency adjustment is to be done or not. The decision at operation 304 is made automatically according to an amount of movement of the person observed through other means, such as optical flow computation on the captured image data, use of global positioning signals in a head mounted display worn by the person or in other ways.

If latency adjustment is to go ahead, the process moves to operation 308 whereby an amount of latency is determined. Various ways of determining the amount of latency are used.

In an example, a round trip time is measured for each of the functions 102, 104. To measure the round trip time, a frame of captured data is time stamped and an observation is made as to when the frame of captured data results in an update to the hologram 124 via the photoreal representation function. The round trip time is the duration between the time stamp and the observed update to the hologram. A round trip time is also measured for the case where the update is via the parametric model function. The difference between the round trip times for the two cases gives the latency between the streams 300, 302.

In another example, a default value for the latency is selected and then the latency is adjusted on a trial an error basis. Observations of continuity of action in a stream of the holograms 124 or continuity of action of an avatar are made. The latency is adjusted on a trial and error basis so that it improves the observed continuity of action. Continuity of action means motion of one or more body parts of the person depicted in the hologram or avatar being continuous rather than partial. Where a body part is moving along a trajectory and part way along the trajectory the hologram depiction or avatar control is lost then the continuity of action is poor.

In some cases latency is extremely difficult to determine accurately since video encoding and decoding of holograms and captured image data introduces variable delay which is difficult to anticipate. In such situations using round trip time to measure latency is a working baseline but is not accurate to high levels. To address this one option is to have the photoreal representation construction function 104 and parametric model instance construction function 102 establish a joint communication session with the same network server in the communications network 100. The network server has a single clock which is used to measure the latency between the streams 300, 302 by assigning time stamps to data using the single clock and observing durations of time until the time stamped data influences the hologram and/or avatar.

Where the determined latency (e.g., latency determination 708 in FIG. 7) is over a threshold amount the process of FIG. 3 accesses 310 historical data by looking back to previous entries in one of the streams of data. In this way a current entry in one of the streams is paired with a previous entry in the other stream in order to account for the latency. The pair of entries from the stream is input to operation 306 to compute the alignment between the two representations.

Figure 4:
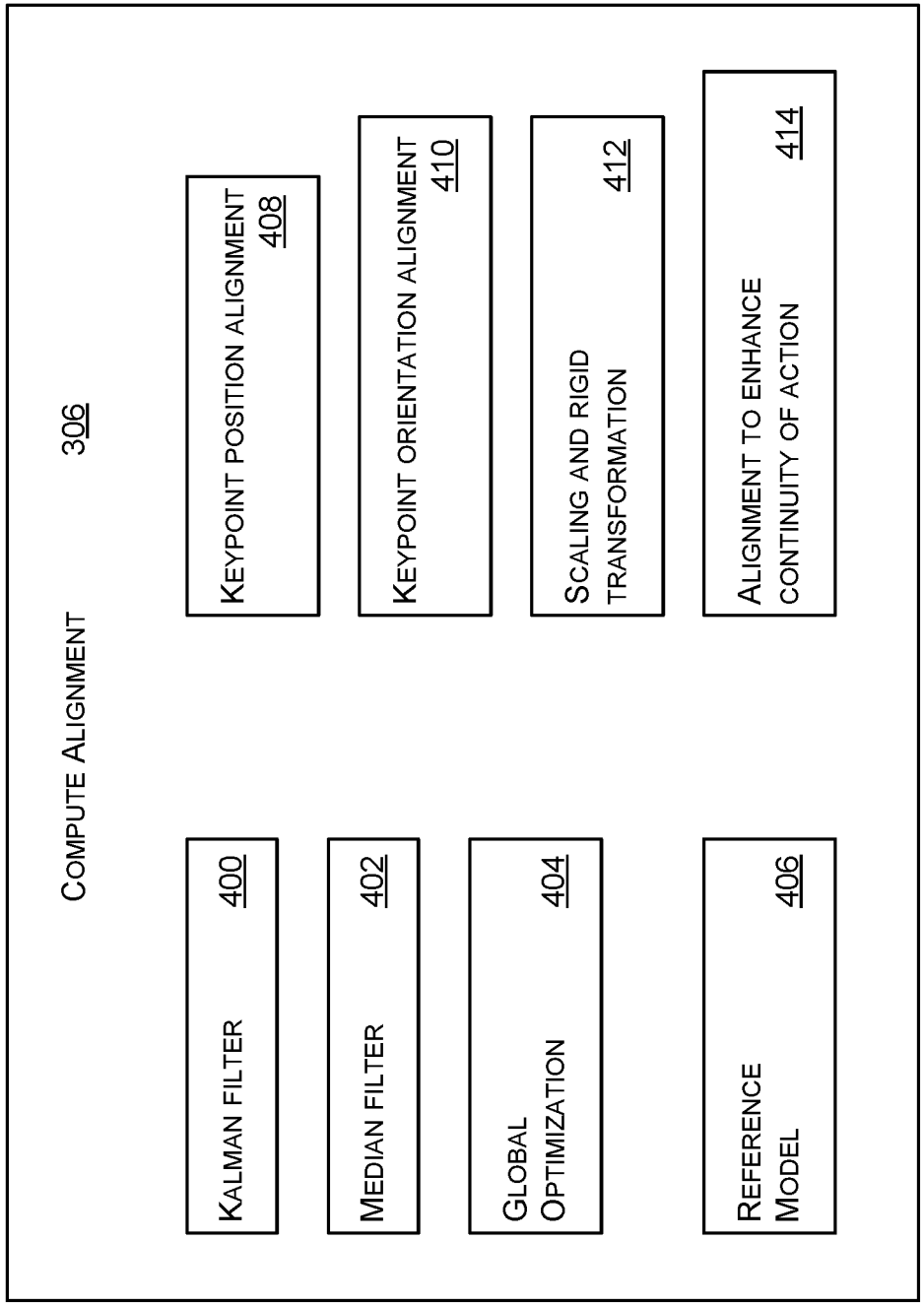
FIG. 4 is a schematic diagram of the alignment service of FIG. 1.

With reference to FIG. 4, various different ways of computing the alignment between the two 3D representations are used. In an example, a Kalman filter 400 is used. The Kalman filter takes as input the stream of parametric model data 300 and the stream of photoreal representation data 302 which are optionally staggered with respect to one another to adjust for latency. In an example the stream of parametric model data comprises sets of values of the parameters of the parametric model at different times and the stream of photoreal representation data comprises corresponding values (such as 3D positions of joint locations) from the photoreal representation. The Kalman filter fuses the streams of values and outputs predicted values which are those of an aligned representation aligning the two 3D representations. It is possible to use a median filter 402 in place of a Kalman filter.

In an example global optimization 404 is used. In this method an energy function is defined over 3D positions and orientations in both 3D representations of a plurality of keypoints. The energy function is minimized using a global optimization to compute values of the 3D positions and orientations of the keypoints which are those of an aligned representation aligning the two 3D representations. Any suitable optimization process is used such as gradient descent.

In an example, one of the 3D representations is selected as a reference 406. In this case the reference 3D representation is not changed. The other 3D representation is adjusted to be more like the reference 3D representation in order to achieve the alignment. This approach is found to be particularly efficient.

In an example, keypoint position alignment 408 is used. In this case one or more keypoints are specified such as a centre of the person's head, a left shoulder of the person, a right shoulder of the person, a left hand of the person, a right hand of the person. A 3D position of the one or more keypoints is found from the photoreal representation and compared with the 3D position of the same keypoint from the parametric model. Alignment seeks to reduce the difference between the 3D positions of the one or more keypoints. In order to cope with noise in the keypoint position values rolling averages are computed as described in more detail later. In some cases errant values of the 3D position data are removed before computing the alignment.

In another example keypoint orientation alignment 410 is used. In this case one or more keypoints are specified such as a centre of the person's head, a left shoulder of the person, a right shoulder of the person, a left hand of the person, a right hand of the person. A 3D orientation of the one or more keypoints is found from the photoreal representation and compared with the 3D orientation of the same keypoint from the parametric model. Alignment seeks to reduce the difference between the 3D orientations of the one or more keypoints. In order to cope with noise in the keypoint orientation values rolling averages are computed as described in more detail later. In some cases errant values of the 3D orientation data are removed before computing the alignment. Keypoint orientation alignment 410 is combined with keypoint position alignment 408 in some cases.

In an example alignment comprises scaling and computing a rigid transformation 412. In this case an instance of the parametric model is scaled to a true scale of the person and the photoreal representation is at a calibrated scale. The true scale of the person is known from demographic data about people's sizes, or is available from user input or user account data. A calibration process is used to determine the calibrated scale for the photoreal representation. The calibration process comprises placing an object with known size in the environment at a known 3D position and orientation and generating a photoreal representation in order to find the scale relation between the known object and the photoreal representation. Once the parametric model has been scaled to the true scale of the person and the photoreal representation is at a calibrated scale it is possible to compute a rigid transformation in order to map the parametric model to the photoreal representation or vice versa.

In another example, an alignment of the two 3D representations is selected at random and is adjusted on a trial and error basis in such a way as to enhance continuity of action 414 observed in the stream of holograms or avatars.

Figure 5:
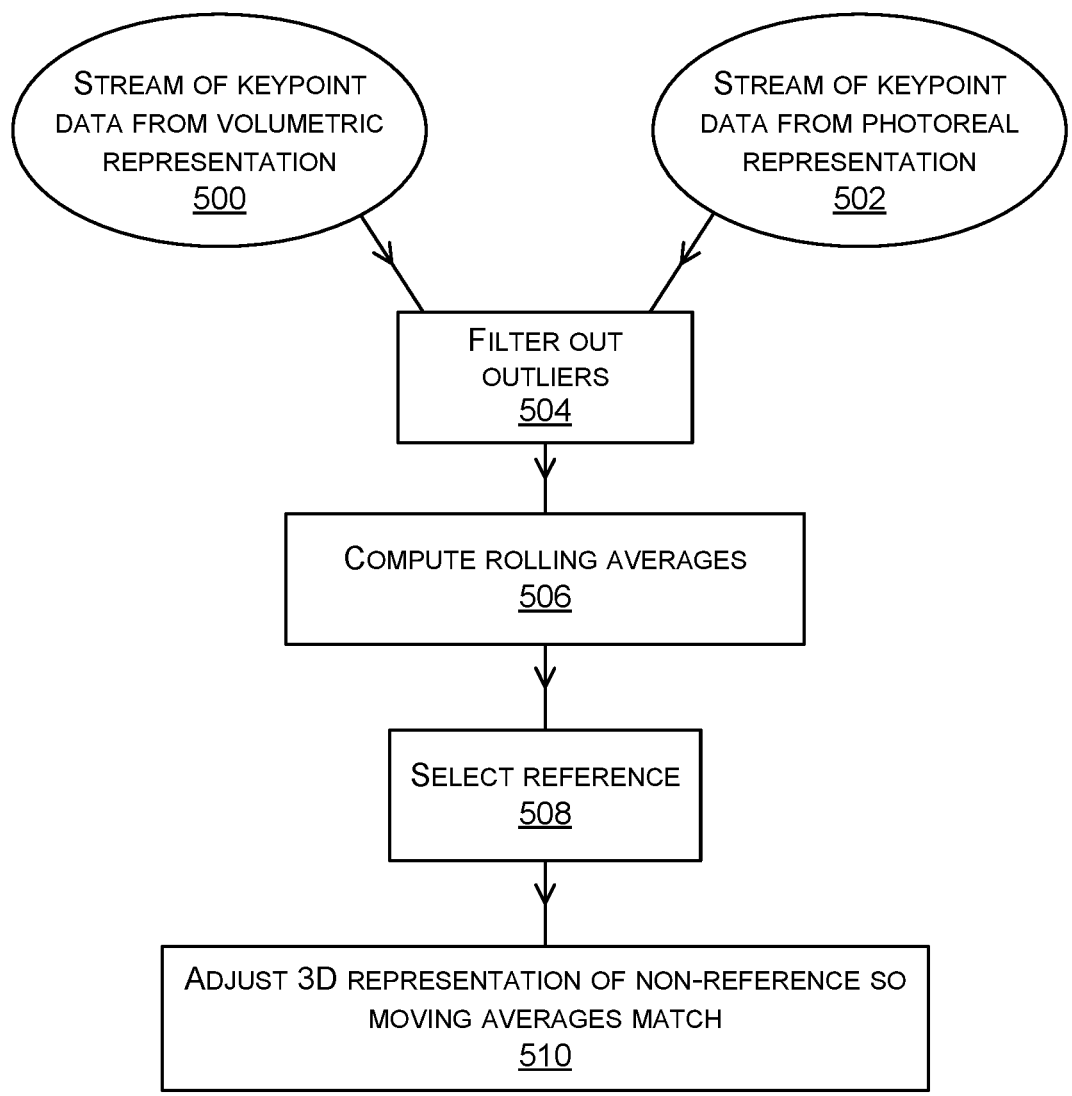
FIG. 5 is a flow diagram of a process carried out at the alignment service of FIG. 1.

With reference to FIG. 5 an example where rolling averages are used is given. A filter 504 filters out outliers from a stream 500 of keypoint data from the photoreal representation. The filter 504 also filters out outliers from a stream 502 of keypoint data from the parametric model. The keypoint data is 3D position and/or orientation for one or more specified keypoints such as head, left shoulder, right shoulder, right hand, left hand. The method involves computing rolling averages 506 such as a rolling average 3D position for each keypoint from the photoreal stream and a rolling average 3D position for each keypoint from the parametric model stream.

One of the 3D representations is selected 508 as a reference. For example, the photoreal representation is taken as the reference. A transform is computed to transform the rolling average 3D position for the non-reference 3D representation to match the rolling average 3D position for the reference 3D representation. If there is more than one keypoint the transform is computed for each keypoint and an average is taken.

The non-reference 3D representation is then adjusted 510 by applying the transform.

Figure 6:
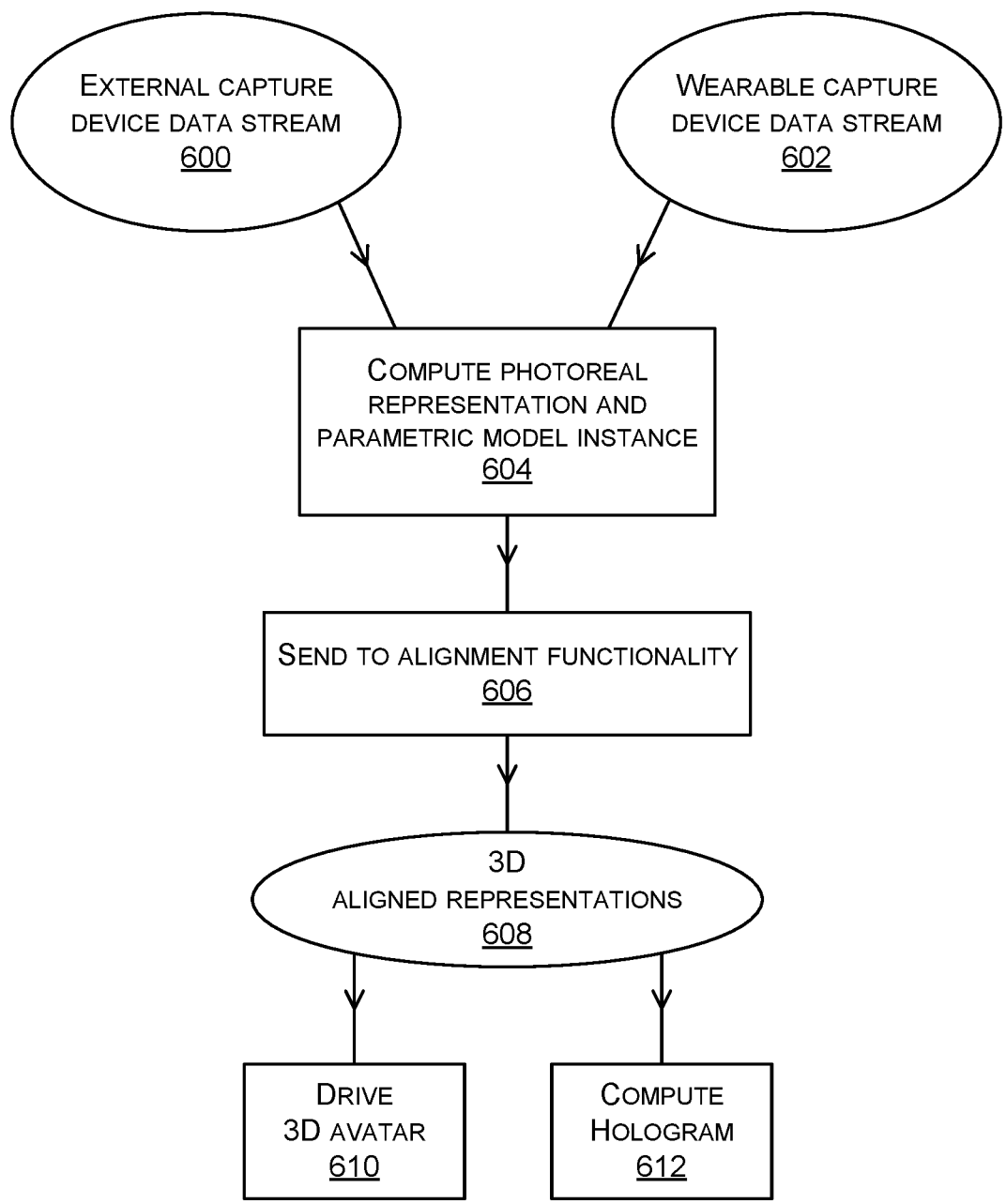
FIG. 6 is a flow diagram of a process of computing 3D representations, alignment and also control of holograms and/or avatars.

With reference to FIG. 6, an external capture device 118 (see FIG. 1) captures a stream of data 600 which is input to a process 604 for computing 3D representations. A wearable capture device 116 (see FIG. 1) also captures a stream of data 602 which is also input to the process 604 for computing 3D representations.

A photoreal representation of a person depicted in the captured data is computed. In an example, the photoreal representation is a volumetric representation of a person depicted in the captured data and is computed using iterative closest point as described earlier in this document. Captured data from one or both of the data streams 600, 602 is used to compute the photoreal representation.

A parametric model instance is computed 604 and fitted to the captured data from one or both of the streams 600, 602 using any suitable model fitting technology as described above.

The photoreal representation (in one example the photoreal representation is a volumetric model) is a first 3D representation and the parametric model instance is a second 3D representation. The first and second 3D representations, or data from these, is sent to an alignment function 606 and aligned 3D representations are obtained 608. The aligned 3D representations are used to compute a hologram 612. In an example a hologram is computed by using ray tracing according to a first virtual camera position to compute a first image of a stereo pair. A second image of the stereo pair is computed by using ray tracing according to a second virtual camera position displaced from the first virtual camera position by an inter ocular distance of a viewer such as participant 122. The stereo images are projected into the pupils of the eyes of the participant 122 or are displayed using other stereo display apparatus. The ray tracing is done using both of the 3D representations (photoreal and parametric) and the results overlaid to produce a composite where blanks due to missing data in one of the 3D representations are filled in using corresponding data in the other 3D representation where it is available.

Figure 7:
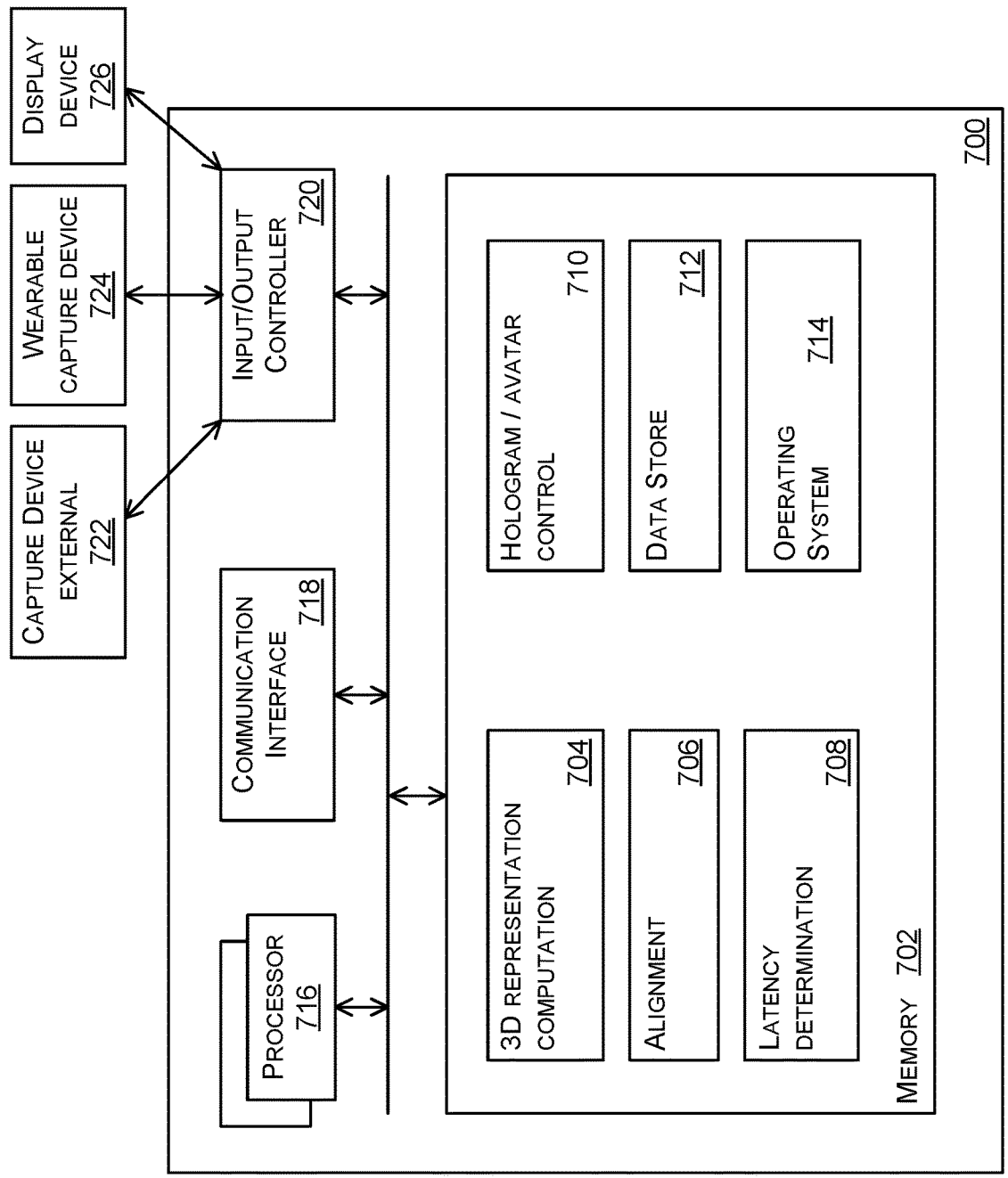
FIG. 7 illustrates an exemplary computing-based device in which embodiments of alignment of 3D representations are implemented.

In order to drive (e.g., control) a 3D avatar 610, the values of the parameters of the parametric model are mapped to corresponding parameters of the 3D avatar. Where parameter values are uncertain or unavailable due to missing captured data, the parameter values are obtained from the aligned photoreal representation. In this way body parts of the avatar are animated in 3D as per the real person FIG. 7 illustrates various components of an exemplary computing-based device 700 which are implemented as any form of a computing and/or electronic device, and in which embodiments of an alignment service for aligning different 3D representations of a person are implemented in some examples.

Computing-based device 700 comprises one or more processors 716 which are microprocessors, controllers or any other suitable type of processors for processing computer executable instructions to control the operation of the device in order to compute an alignment between two different 3D representations of a person. In some examples, for example where a system on a chip architecture is used, the processors 716 include one or more fixed function blocks (also referred to as accelerators) which implement a part of the method of aligning two different 3D representations of a person in hardware (rather than software or firmware). Platform software comprising an operating system 714 or any other suitable platform software is provided at the computing-based device to enable application software to be executed on the device. Computer executable instructions for 3D representation computation 704 are stored in the memory 702 such as an iterative closest point algorithm for computing a volumetric model and a model fitting algorithm for computing an instance of a parametric model. Computer executable instructions for computing an alignment 706 between two different 3D representations of a person are stored in memory 702 as well as computer executable instructions for hologram and/or avatar control 710. A data store 712 holds transforms computed using the alignment instructions 706, 3D positions and orientations of keypoints, parameter values, parametric models, volumetric models, photoreal representations, captured sensor data and other data.

The computer executable instructions are provided using any computer-readable media that is accessible by computing based device 700. Computer-readable media includes, for example, computer storage media such as memory 702 and communications media. Computer storage media, such as memory 702, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 702) is shown within the computing-based device 700 it will be appreciated that the storage is, in some examples, distributed or located remotely and accessed via a network or other communication link (e.g. using communication interface 718).

The computing-based device 700 also comprises an input/output controller 720 arranged to output display information to a display device 726 which may be separate from or integral to the computing-based device 700. The display information may provide a stereoscopic display such as holograms. The input/output controller 720 is also arranged to receive and process input from one or more devices, such as an external capture device 722 which is a depth camera and/or color camera, a wearable capture device 724 which is a head worn computer in some cases.

Alternatively or in addition to the other examples described herein, examples include any combination of the following:

Clause A. An apparatus for aligning three-dimensional, 3D, representations of people, the apparatus comprising:
at least one processor;
a memory storing instructions that, when executed by the at least one processor, perform a method comprising:
accessing a first 3D representation which is an instance of a parametric model of a person; accessing a second 3D representation which is a photoreal representation of the person; computing an alignment of the first and second 3D representations; and computing and storing a hologram from the aligned first and second 3D representations such that the hologram depicts parts of the person which are observed in only one of the first and second 3D representations; or controlling an avatar representing the person where the avatar depicts parts of the person which are observed in only one of the first and second 3D representations.

Clause B The apparatus of clause A wherein the alignment is computed by for at least one keypoint depicted in the first and second 3D representations, adjusting one or both of the first and second 3D representations to bring a 3D position and orientation of the keypoint in the first representation to the same 3D position and orientation of the keypoint in the second representation.

Clause C The apparatus of any preceding clause wherein the photoreal representation is a volumetric model.

Clause D The apparatus of any preceding clause wherein the instance of the parametric model is scaled to a true scale of the person and wherein the photoreal representation is at a calibrated scale and wherein the alignment is computed by computing a rigid transformation.

Clause E The apparatus of any preceding clause wherein accessing the first 3D representation comprises accessing a first stream of first 3D representations which are instances of the parametric model of the person; and wherein accessing the second 3D representation comprises accessing a second stream of instances of the photoreal representation, and wherein computing the alignment comprises computing alignments of the first and second 3D representations from the first and second streams taking into account a latency between the first and second streams.

Clause F The apparatus of clause E wherein the first and second streams of 3D representations are computed from images depicting at least part of the person captured by a wearable capture device worn by the person and an external capture device, independent of the person.

Clause G The apparatus of clause F wherein the photoreal representations are computed from image data captured by the wearable capture device and the external capture device.

Clause H The apparatus of clause F wherein the photoreal representations are computed only from image data captured by the external capture device.

Clause I The apparatus of clause E wherein the latency is computed by measuring a first time between capture of image data and receipt of a corresponding instance of the parametric model, and a second time between capture of image data and receipt of a corresponding instance of the photoreal representation and computing the latency as a difference between the first and second times.

Clause J The apparatus of clause I wherein the first and second times are measured using a single network clock on a server.

Clause K The apparatus of clause E wherein the instances of the parametric model of the person are computed from a wearable capture device worn by the user and the instances of the photoreal representation of the person are computed from an external capture device independent of the person, and wherein a latency between the first and second streams is computed by establishing a networking session between the wearable capture device and a network server and between the external capture device and the network server, and using a clock at the network server to measure the latency.

Clause L The apparatus of clause E wherein computing the alignment comprises adjusting one or both of the first and second 3D representations such that continuity of action of the person depicted in holograms generated from the 3D representations is enhanced.

Clause M The apparatus of clause A the instructions comprising generating a hologram from the aligned first and second 3D representations such that the hologram depicts parts of the person which are observed in only one of the first and second 3D representations; and sending the hologram to a hologram projection apparatus at a remote entity.

Clause N A computer-implemented method for aligning three-dimensional, 3D, representations of people, the method comprising:
accessing a first 3D representation which is an instance of a parametric model of a person; accessing a second 3D representation which is a photoreal representation of the person; computing an alignment of the first and second 3D representations;
computing and storing a hologram from the aligned first and second 3D representations such that the hologram depicts parts of the person which are observed in only one of the first and second 3D representations; or
controlling an avatar representing the person where the avatar depicts parts of the person which are observed in only one of the first and second 3D representations.

Clause O The method of clause N comprising transmitting the hologram to a hologram projection apparatus worn by another person.

Clause P The method of clause N or clause O comprising computing the instance of the parametric model from image data captured by a capture device worn by the person and computing the photoreal representation from image data captured by an external capture device independent of the person.

Clause Q The method of any of clauses N to P wherein the alignment is computed by adjusting a rotation of at least one keypoint of the person.

Clause R The method of any of clauses N to Q wherein the instance of the parametric model is scaled to a true scale of the person and wherein the photoreal representation is at a calibrated scale and wherein the alignment is computed by computing a rigid transformation.

Clause S The method of any of clauses N to R wherein the alignment comprises computing a latency between the first and second 3D representations.

Clause T One or more device-readable media with device-executable instructions that, when executed by a computing system, direct the computing system to perform operations comprising:
accessing a first 3D representation which is an instance of a parametric model of a person;
accessing a second 3D representation which is a photoreal representation of the person;
computing an alignment of the first and second 3D representations by taking one of the first and second 3D representations as a reference and adjusting the other of the first and second 3D representations to correspond with the reference; and
computing and storing a hologram from the aligned first and second 3D representations such that the hologram represents parts of the person which are observed in only one of the first and second 3D representations; or
controlling an avatar representing the person where the avatar depicts parts of the person which are observed in only one of the first and second 3D representations.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. An apparatus comprising:
a processor;
a memory storing instructions that, when executed by the processor, perform a method comprising:
accessing a first three-dimensional (3D) representation which is an instance of a parametric model of a portion of a person, wherein the parametric model is a skeletal model and includes parameters comprising 3D positions of the skeletal model;
accessing a second 3D representation which is a photoreal representation of a substantial portion of the person represented by the parametric model, wherein the photoreal representation is a volumetric model comprising a plurality of voxels representing regions of real world space;
detecting a latency between the first and second 3D representations;
comparing the detected latency to a latency threshold;
based on the comparing, determining that the detected latency exceeds the latency threshold;
adjusting for the latency between the first and second 3D representations;
computing an alignment of the first and second 3D representations; and
computing and storing a hologram from the aligned first and second 3D representations such that the hologram depicts a part of the person which is observed in only one of the first and second 3D representations.

2. The apparatus of claim 1 wherein the alignment is computed by, for a keypoint depicted in each of the first and second 3D representations, adjusting one or both of the first and second 3D representations to bring a 3D position and orientation of the keypoint in the first 3D representation to a same 3D position and orientation of a same keypoint in the second 3D representation.

3. The apparatus of claim 1 wherein the volumetric model is constructed from depth data using an iterative closest point algorithm.

4. The apparatus of claim 1 wherein:
the instance of the parametric model is scaled to a true scale of the person,
the photoreal representation is at a calibrated scale determined by placing an object with a known size in an environment at a known 3D position and orientation, and generating the photoreal representation to find a scale relation between the object and the photoreal representation, and
the alignment is computed by computing a rigid transformation.

5. The apparatus of claim 1 wherein accessing the first 3D representation comprises accessing a first stream of first 3D representations which are instances of the parametric model of the person; and wherein accessing the second 3D representation comprises accessing a second stream of instances of the photoreal representation, and wherein computing the alignment comprises computing alignments of the first and second 3D representations from the first and second streams taking into account a latency between the first and second streams.

6. The apparatus of claim 5 wherein the first and second streams of 3D representations are computed from images depicting a part of the person captured by a wearable capture device worn by the person and an external capture device, independent of the person.

7. The apparatus of claim 6 wherein the photoreal representations are computed from image data captured by the wearable capture device and the external capture device.

8. The apparatus of claim 6 wherein the photoreal representations are computed only from image data captured by the external capture device.

9. The apparatus of claim 5 wherein:
the first 3D representation is accessed from a parametric model instance construction function and the second 3D representation is accessed from a photoreal representation construction function, and
the latency is computed by establishing a joint communication session between the parametric model instance construction function and the photoreal representation construction function with a network server and measuring a first time between capture of image data and receipt of a corresponding instance of the parametric model, and a second time between capture of image data and receipt of a corresponding instance of the photoreal representation and computing the latency as a difference between the first and second times, wherein the first time and the second time are measured by a single clock on the network server.

10. The apparatus of claim 5 wherein the instances of the parametric model of the person are computed from a wearable capture device worn by a user and the instances of the photoreal representation of the person are computed from an external capture device independent of the person, and wherein a latency between the first and second streams is computed by establishing a networking session between the wearable capture device and a network server and between the external capture device and the network server, and using a clock at the network server to measure the latency.

11. The apparatus of claim 5 wherein computing the alignment comprises adjusting one or both of the first and second 3D representations such that continuity of action of the person depicted in holograms generated from the first and second 3D representations is enhanced.

12. The apparatus of claim 1 the instructions comprising generating a hologram from the aligned first and second 3D representations such that the hologram depicts a part of the person which is observed in only one of the first and second 3D representations; and sending the hologram to a hologram projection apparatus at a remote entity.

13. A computer-implemented method comprising:
accessing a first three-dimensional (3D) representation which is an instance of a parametric model of a portion of a person, wherein the parametric model is a skeletal model and includes parameters comprising 3D positions of the skeletal model;
accessing a second 3D representation which is a photoreal representation of a substantial portion of the person represented by the parametric model, wherein the photoreal representation is a volumetric model comprising a plurality of voxels representing regions of real world space;

detecting a latency between the first and second 3D representations;

comparing the detected latency to a latency threshold;

based on the comparing, determining that the detected latency exceeds the latency threshold;

adjusting for the latency between the first and second 3D representations;

computing an alignment of the first and second 3D representations; and computing and storing a hologram from the aligned first and second 3D representations such that the hologram depicts a part of the person which is observed in only one of the first and second 3D representations.

14. The method of claim 13 comprising transmitting the hologram to a hologram projection apparatus worn by another person.

15. The method of claim 13 comprising computing the instance of the parametric model from image data captured by a capture device worn by the person and computing the photoreal representation from image data captured by an external capture device independent of the person.

16. The method of claim 13 wherein the alignment is computed by adjusting a rotation of a keypoint of the person.

17. The method of claim 13 wherein the instance of the parametric model is scaled to a true scale of the person and wherein the photoreal representation is at a calibrated scale and wherein the alignment is computed by computing a rigid transformation.

18. The method of claim 13 wherein the alignment comprises computing a latency between the first and second 3D representations.

19. A computer storage medium with device-executable instructions that, when executed by a computing system, direct the computing system to perform operations comprising:

accessing a first three-dimensional (3D) representation which is an instance of a parametric model of a portion of a person, wherein the parametric model is a skeletal model and includes parameters comprising 3D positions of the skeletal model;

accessing a second 3D representation which is a photoreal representation of a substantial portion of the person represented by the parametric model, wherein the photoreal representation is a volumetric model comprising a plurality of voxels representing regions of real world space;

detecting a latency between the first and second 3D representations;

comparing the detected latency to a latency threshold;

based on the comparing, determining that the detected latency exceeds the latency threshold;

adjusting for the latency between the first and second 3D representations;

computing an alignment of the first and second 3D representations by taking one of the first and second 3D representations as a reference and adjusting the other of the first and second 3D representations to correspond with the reference; and controlling an avatar representing the person where the avatar depicts a part of the person which is observed in only one of the first and second 3D representations.

20. The one or more computer storage media of claim 19 wherein the alignment is computed by, for at least one keypoint depicted in each of the first and second 3D representations, adjusting one or both of the first and second 3D representations to bring a 3D position and orientation of the keypoint in the first 3D representation to a same 3D position and orientation of a same keypoint in the second 3D representation.

* * * * *